United States Patent [19]

Parenti

[11] Patent Number: 4,869,737
[45] Date of Patent: Sep. 26, 1989

[54] APPARATUS FOR CLEANING AIR IN COAL MINES

[76] Inventor: Joseph A. Parenti, 1204 Buckhannon, Morgantown, W. Va. 26505

[21] Appl. No.: 296,236

[22] Filed: Jan. 12, 1989

[51] Int. Cl.$^4$ .............................................. B01D 46/02
[52] U.S. Cl. ..................................... 55/213; 55/321; 55/337; 55/348; 55/385.5; 55/415
[58] Field of Search .................................. 55/212–214, 55/304, 320, 321, 337, 345, 348, 385.5, 415, 418; 299/12

[56] References Cited

U.S. PATENT DOCUMENTS 3,842,461 10/1974 Wurster ............................. 55/418 X
4,348,057 9/1982 Parenti et al. ........................ 299/12
4,767,425 8/1988 Complin et al. ................... 55/337 X Primary Examiner—Charles Hart
Attorney, Agent, or Firm—Emrich & Dithmar

[57] ABSTRACT

The apparatus includes a large-capacity main blower for drawing in air from the face of coal being mined. The main blower draws the air sequentially through a grid which deflects large pieces of coal into a refuse bin, and a main stage of centrifugal filters which separates dust and particles into a stream of dirty air while discharging the clean air back into the mine. The dirty air is routed through a secondary stage of centrifugal filters which is energized by a second blower or pressure unit, the output of which is then routed through a cloth filter stage. Only clean air is discharged into the atmosphere. An air balancing device maintains proper operating pressures in the secondary filter stage for more efficient processing of the dirty air discharge. An adjustable balancing plate maintains proper operating pressure at the collection outlets for the main and secondary filter stages. A device is also included for incorporating rock dust into the main clean air discharge using the power available at the main blower to reduce any hazard.

11 Claims, 4 Drawing Sheets

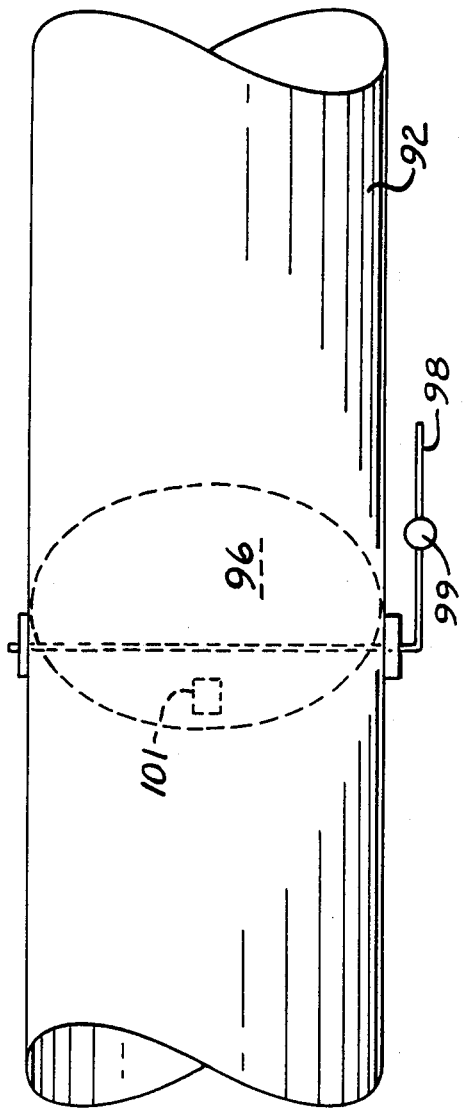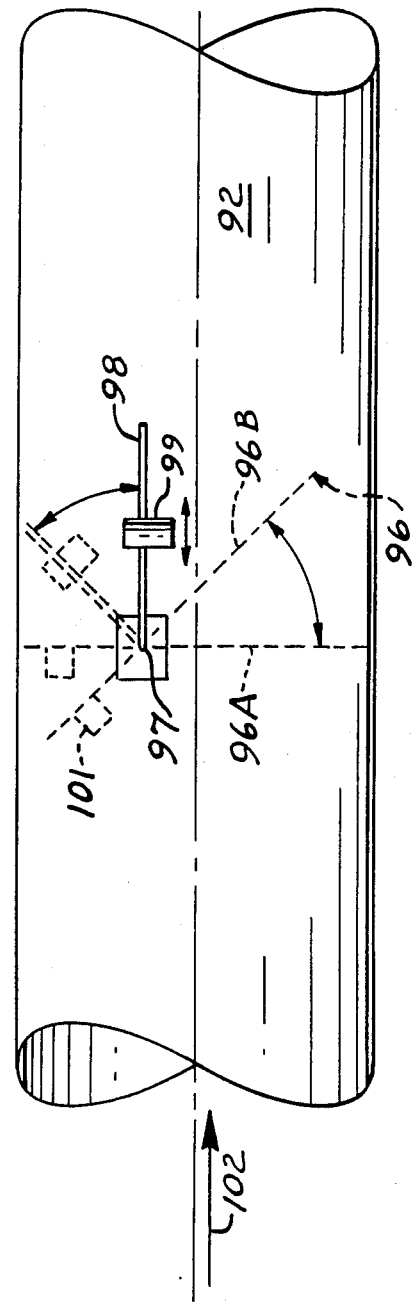

APPARATUS FOR CLEANING AIR IN COAL MINES

FIELD OF THE INVENTION

The present invention relates to a machine for cleaning air taken adjacent the face of the coal as it is mined. The apparatus works in conjunction with, but separate from, a conventional coal-cutting machine which cuts and mines the coal and then loads it onto a conveyor which transports the coal through a return tunnel to a delivery area.

The air cleaning apparatus of the present invention is a separate vehicle having its own chassis and wheels, and which is designed to work close to a coal mining machine so that an adjustable length ventilating duct may be installed as near as possible to the face of the coal being mined and thereby provide an intake for the dusty air which is inherently generated in using modern coal mining techniques.

BACKGROUND OF THE INVENTION

The present invention represents improvements in the apparatus and method disclosed in U.S. Pat. No. 4,348,057 of Parenti, et al. The machine disclosed in that patent includes a large-capacity main blower for drawing air from a location adjacent the face of the coal being mined. The main blower draws the air through a grid which deflects large pieces of coal into a refuse bin. After passing through the grid, the air passes through a main stage of centrifugal filters which separates dust and particles into a stream of dirty air and discharges the clean air back into the mine. The dirty air is routed through a secondary stage of centrifugal filters which is energized by a second blower, sometimes referred to as a pressure unit. In an effort to further clean the air before it is discharged back into the mine and particularly to remove very small particles and respirable dust, the output of the pressure unit is routed through a cloth filter stage and thence into the atmosphere.

The cloth filter stage is considered to be a significant part of the machine because, whereas the centrifugal filters are capable of handling larger volumes of air, they are not capable as a practical matter of filtering out very tiny particles having a size of 10 microns or less, and commonly referred to as "respirable" dust. It is just such respirable dust which may be most harmful to miners. Thus, as a practical matter, it is important to include some type of cloth or other screening filter capable of removing respirable dust from the air during processing and before the clean air is discharged back into the mine.

However, a problem arises in the operation of the machine described above in that after the machine is used for some period of time (e.g., a few hours), the cloth filter begin to clog up as they filter out dust and smaller particles. The machine is equipped with a shaking device for cleaning the cloth filters, but as a practical matter the cloth filters may become congested more quickly than a normal maintenance routine or shaking of the filters would clear them. In such a case, that is, should for any reason, the cloth filters become clogged, the operating pressure for the secondary stage of centrifugal filter may be affected in a way which reduces its effectiveness for separating out dust or particles, thus further exacerbating the problem of clogging the cloth filter.

SUMMARY OF THE INVENTION

The present invention provides a number of improvements in the machine described above. A feedback air balancing device is incorporated in a conduit extending between the high pressure side of the cloth filter housing back to the air inlet immediately upstream of the main filter section. In the illustrated embodiment, the air balancing device is a balancing valve, preferably in the form of a weighted, adjustable plate, which opens when the cloth filter becomes clogged and the pressure on the high pressure side of the cloth filter reaches a predetermined value. Where the pressure on the pressure side of the cloth filter reaches that predetermined value, the valve then opens, permitting air to flow to the inlet of the machine to equalize the pressure across the secondary stage of centrifugal filters. This ensures that the secondary centrifugal filters operate at their design pressure for more efficient processing of the dirty air.

This improvement has the further advantage that the outlet air of the auxiliary pressure unit, in the case where the filter bag has been in use without shaking and has become clogged somewhat, is recirculated rather than admitted into the main air discharge, by routing the dirty air back through both the main and secondary stages of centrifugal filters.

In addition, apparatus for introducing rock dust into the clean air discharge of the main blower, and thus into the mine return, is actuated by a stream of air diverted from the main blower so that no additional pressure unit is needed to mix the rock dust with air or to force the mixture into the mine.

Other features and advantages of the present invention will be apparent to persons skilled in the art from the following detailed description of a preferred embodiment accompanied by the attached drawing wherein identical reference numerals will refer to like parts in the various views.

BRIEF DESCRIPTION OF THE DRAWING

FIGS. 4 and 5 are close-up top and side views of the balancing valve of the system of FIG. 2.

PRIOR ART

Figure 1:
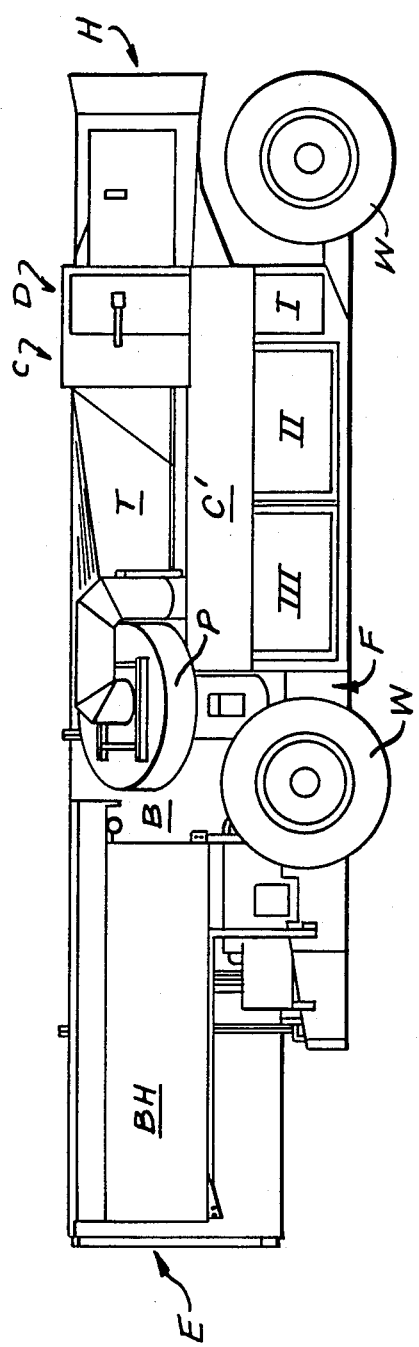
FIG. 1 is an elevational view of the right side of an air cleaning machine for coal dust which illustrates the prior art.

Referring to FIG. 1, in addition to the machine of said U.S. Pat. No. 4,348,057, the prior art includes a frame F having wheels W so that it may be moved to a location near where a mining machine is operation. Air and dust are coupled by a large, extendable conduit (not shown) from a location near the face of coal being mined to an inlet H. A large main blower is housed in the machine in the area designated B; and it draws air through inlet H into a deflector area D and a first centrifugal filter stage C into a transition section T. Clean air is discharged at E. Large pieces of coal are deflected by one or more large screens or grates in D into a refuse bin I. Dirty air from the first filter stage C is routed through a collection bin II into a second stage of centrifugal filter located generally in the area C'. As more fully explained below, dirty air from the second stage of centrifugal filters is routed through a collection bin III by a pressure unit (i.e., blower) P and then into a bag house BH which houses a cloth filter for filtering out small particles and dust before discharging clean air into the main discharge of clean air.

DETAILED DESCRIPTION OF A PREFERRED EMBODIMENT

Figure 2:
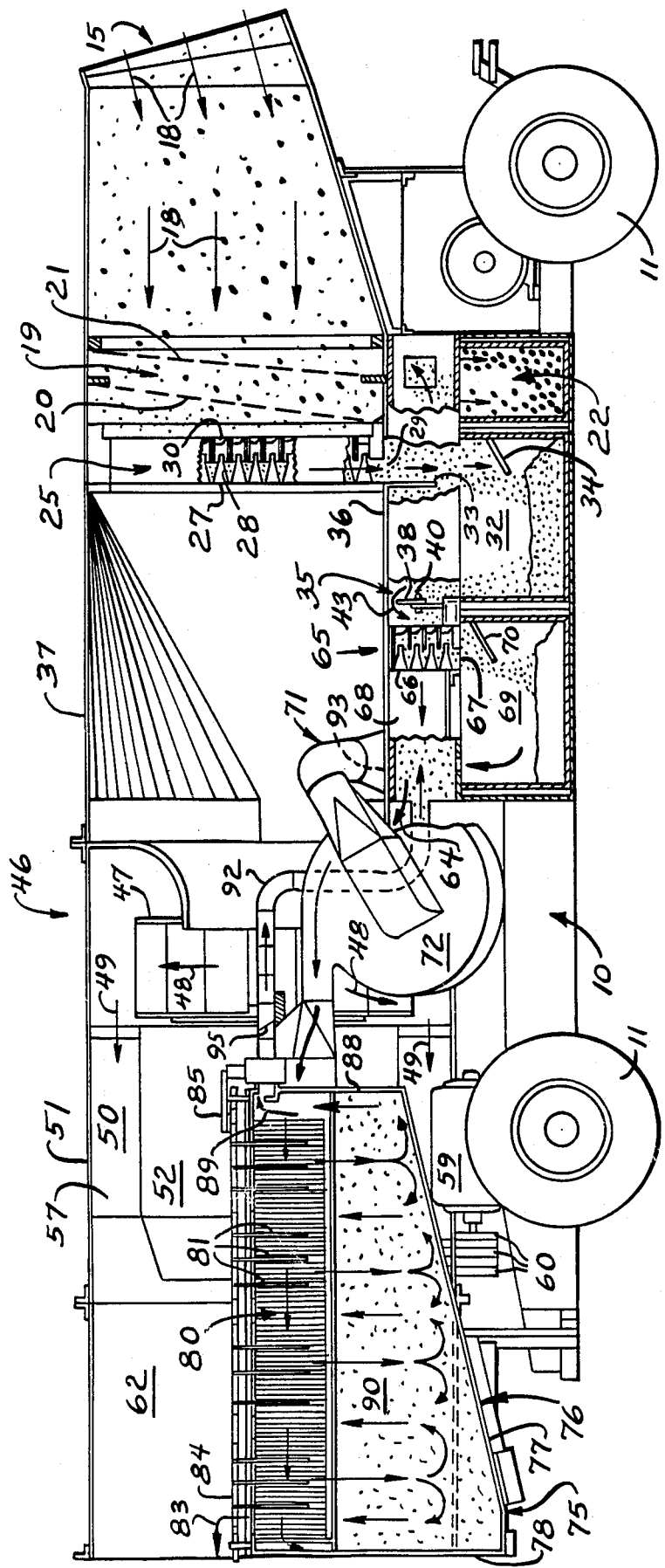
FIG. 2 is a vertical view of an air cleaning machine incorporating the present invention taken from the right side of the machine with certain elements in cross section to view the interior.
Figure 3:
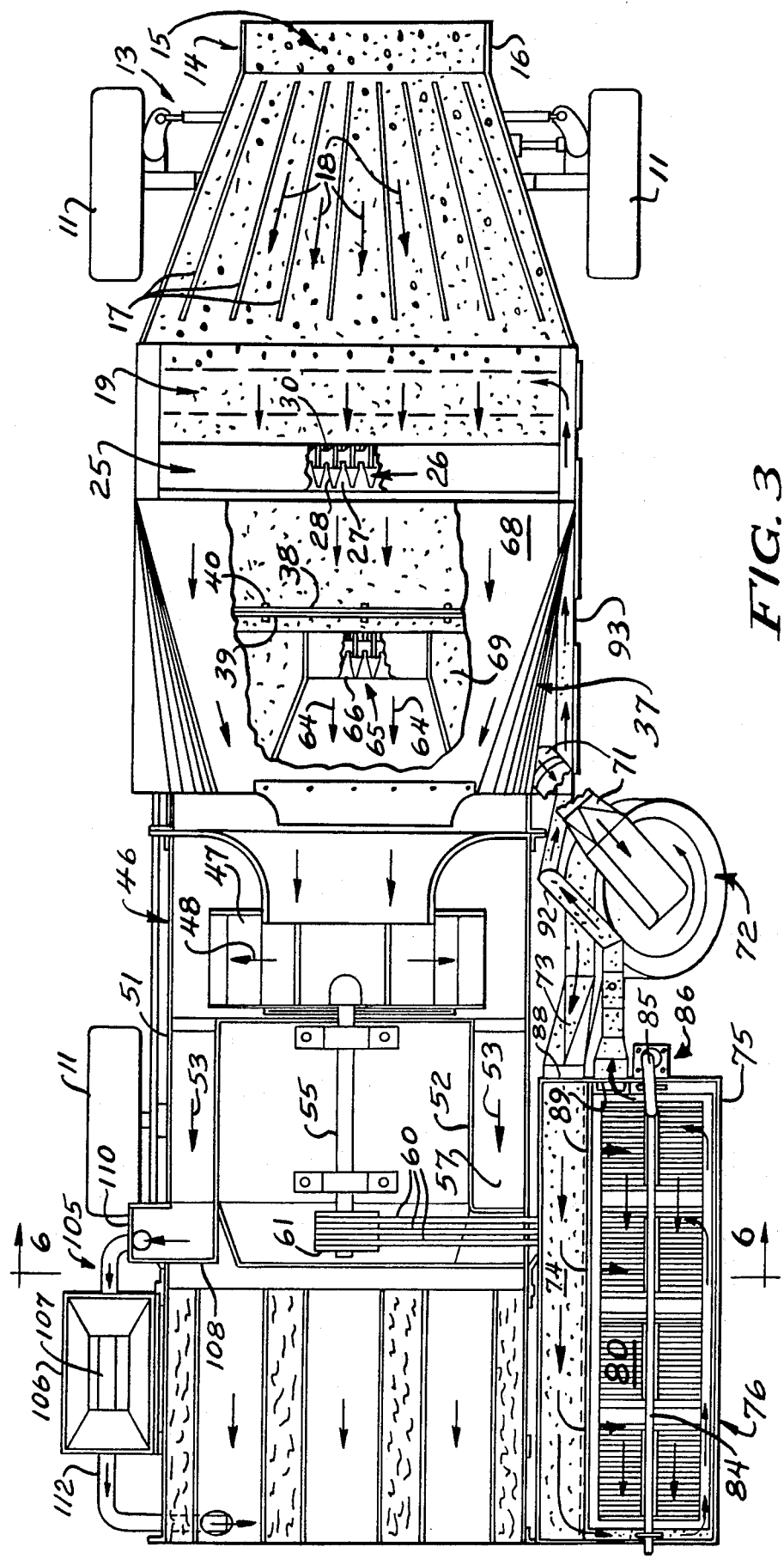
FIG. 3 is a plan view of the machine of FIG. 2 with the top panels removed and with certain elements in cross section for a more clear showing.

Referring to FIGS. 2 and 3, the air cleaning machine of the present invention includes a frame 10 provided with four support wheels 11, the front of the machine being on the right side of FIGS. 2 and 3. The front wheels 11 are connected by a conventional steering mechanism generally designated 13 in FIG. 3. As in the prior art, an inlet cowling 14 provides an inlet opening 15 defined by an inlet collar 16 which is adapted to receive a large duct having a length sufficient so that the inlet of the duct may be located near the area where a mining machine is cutting coal because that is the area where the dust is generated and, therefore, most dense. A plurality of vertical plates 17 is located in the inlet cowling 14 so that the incoming air, as represented by the arrows 18 will travel in a generally linear path and not swirl around.

Immediately downstream of the inlet cowling is an inlet plenum 19 in which there are located two inclined grids, represented schematically by the dashed lines in FIG. 2 and designated respectively 20 and 21. Each of the grids 20, 21 may be similar, but the grid 20 is designed to separate larger particles than is the grid 21. Larger pieces of coal entrained in the incoming air stream strike the grids 20, 21 and are deflected downwardly under gravity into a first refuse bin 22 which extends transversely of the machine and communicates with the inlet plenum 19 by means of an elongated opening extending transversely of the bottom of the inlet plenum 19.

Immediately downstream of the inlet plenum is a main filter section generally designated 25 which extends substantially the entire width of the machine as seen in FIG. 3 as well as substantially the entire active height of the machine above the collection areas to be described further below, as seen in FIG. 2. The main filter section 25 comprises a plurality of individual centrifugal filters 26. The centrifugal filters 26 are described in more detail in U.S. Pat. No. 4,348,057, the disclosure of which is incorporated herein by reference. In brief, each of the centrifugal filters or centrifuges is generally cylindrical in shape, has an inlet facing the intake of the machine, and two outlets. One of the outlets, designated 27 in FIG. 2, is axially aligned with an associated inlet and is defined by a frusto-conically shaped separator core element 28. The main filter section 25 includes a second outlet 29 at the bottom through which dirty air passes. The dirty air outlet 29 communicates with passages in the filter section which collect air passing to the outside of the separator element 28. At the front of each individual filter is a fixed vane 30 which may have a plurality of blades shaped to force air passing from right to left in the drawing into a vortex shape within the filter.

As air passes through each of the individual filter sections at high speed, drawn by a main suction blower to be described, the air and entrained particles are thus forced into a vortex motion by the inlet vanes 30. The heavier mass of the particles causes them to move outwardly to the periphery of the cone-shaped separator elements whereas the lighter air passes through the center. Thus, the particles and respirable dust passes outside the separator element 28 under the centrifugal force created by the vortex so that only clean air passes through the center of the separator element 28 and the discharge outlet 27. The dirty air in which the coal dust and particles are entrained is collected and passed through the dirty air outlet 29 at the bottom of the main filter section and into a second collection bin 32. The dirty air passing in to the collection bin 32 moves vertically downward adjacent vertical plate 33 and then is routed leftward by a deflector plate 34, thereby moving the dirty air into a tortuous path, slowing it down and letting the heavier dust particles to settle out of it at the bottom of the collection bin 32. The only air outlet for the collection bin 32 is a horizontally elongated, narrow outlet 35 (FIG. 2) located immediately below the floor 36 of a transition section 37 for routing the clean air. The slot 35 is an adjustable air balancing slot or gate, the purpose of which will be described later. However, a plate 38 is mounted to vertical wall 39 by means of a plurality of bolts and nuts 40. The plate 38 is provided with vertically extending slots for receiving the bolts; and the plate may be adjusted vertically by sliding it along the nuts to form a desired opening for the gate 35 and then tightening the bolts. As mentioned, dirty air processed by the first filter section passes downwardly through the discharge opening 29 of the main filter section 25, to the right of the vertical wall 33 and then is forced into the main section of bin 32 by deflector plate 34. The air then travels upwardly at the rear of bin 32 and through the slot 35 as represented by the arrow 43.

The transition section 37 conforms the cross-sectional area of the main portion of the machine from a rectangular shape required for the main filter section 25 to a round cross section provided for a main blower section 46. Housed within the main blower section 46 is a large blower fan 47 which forces the clean air radially outwardly as represented by the arrows 48, and the housing of the main filter section 46 forces the air discharging from the blower fan 47 rearwardly in the direction of the arrows 49 in an annular region generally designated 50 located between the outer wall 51 of the machine and an inner circular partition 52 which conforms substantially to the diameter of the main blower fan 47 and which houses the drive shaft 55 and suitable bearings for the main blower fan.

The main blower fan 47, of course, creates the suction for drawing the dirty air with entrained particles and dust through the inlet cowling 14 and the main filter section 25. A plurality of radially extending vanes 57 are located in the annular space between the outer housing 51 and the inner housing 52. As seen in FIG. 3, the vanes 57 are spaced at equal angular increments about the wall 52 so that the discharging clean air flows in a generally linear direction as represented by the arrows 53 in FIG. 3.

An electric motor 59 (see FIG. 2) is mounted on the frame 10, and its output shaft drives a sheave. Three separate belts designated 60 in FIGS. 2 and 3 are entrained around the output sheave of the motor 59, and they are also entrained around a second sheave 61 (FIG.

3) located within the inner housing 52 and driving the drive shaft 55 of the blower 47.

Returning now to the portion of the system which processes dirty air, the dirty air which passes through the collection bin 32 also passes through the gate 35 in the direction of arrow 43 into a secondary centrifugal filter section generally designate 65. The secondary filter section 65 comprises a plurality of individual centrifugal filters similar to those designated 26 and described above in connection with the primary centrifugal filter stage 25. The clean air outlets of the individual filters of the secondary filter section are designated 66 and the dirty air outlet is designated 67 in FIG. 2. Air exiting from the clean air outlets 66 flows through a conduit 68 and thence into the inlet of the main blower fan 47, as indicated by arrows designated 64 in FIGS. 2 and 3.

Air exiting from the dirty air discharge outlet 67 of the secondary filter stage 65 passes downwardly into a third collection bin 69, and the air is deflected by a plate 70 through the bin and toward a discharge opening into a conduit 71 which couples the dirty air to an auxiliary blower fan generally designated 72 and sometimes referred to as a pressure unit because its primary function is to provide the necessary pressure differential for efficient removal of dust and dirt particles by the secondary filter section 65, as well as to provide a slight positive pressure for the cloth filter stage, to be described.

The outlet of the pressure unit 72 is coupled through a conduit 73 (see FIG. 3) to an inlet manifold 74 of a housing 75 of a cloth filter section generally designated 76. The bottom wall 77 of the housing 75 is inclined downwardly and rearwardly so that particles shaken from the cloth filters may be removed under gravity assist through a door 78 formed in the rear wall of the housing 75. A cloth filter assembly generally designated 80 is mounted in the housing 75, and it includes a plurality of generally rectangular wire hangers 81 (see FIG. 3) about which is suspended a filter cloth 82 of the type used in large commercial vacuum cleaning machines and capable of filtering out dust and small particles having a size less than 10 microns. The filter 82 may be provided in a number of sections because of the volume of air being processed by the instant machine, and it is only necessary that all of the air passing from the pressure unit 72 into the inlet manifold 74 pass through the cloth filters 80 before the discharge air enters into the discharge plenum 62 as diagrammatically represented by the arrow 83 in FIG. 2.

The hangers 81 are attached to an upper hanger bar 84 which is mounted by means of a link 85 to an eccentric drive motor generally designated 86. When the drive motor 86 is actuated, the eccentric drive via link 85 causes the shaker rod 84 to reciprocate axially, thereby shaking the filter cloth 80 by means of the hangers 81 and shaker rod 84. This cleans the filter by dislodging particles trapped in the filter cloth to fall by gravity to the bottom of the housing 74.

As previously mentioned, although a cloth filter section is known in the art to be highly desirable in that it has an ability to filter out very fine particles, down even to respirable dust size, the volume of air processed by the air cleaning machine is so great that after an extended period of use, the cloth filters tend to clog. This creates a problem in that the pressure in the chamber 90 beneath the cloth filter 80, which normally operates at a pressure slightly above atmospheric pressure (e.g., 1 psi ($H_2O$)), may increase. Any increase in pressure in the chamber 90 normally would be reflected back through the pressure unit 72, thereby lowering the pressure within the dust collection bin 69 for the second centrifugal stage 65, resulting in a much less efficient operation of the second filter stage because of the resulting decrease in operating pressure.

To overcome this problem, the present invention provides a pressure feedback loop generally designated by reference numeral 92 for equalizing the pressure between the chamber 90 of the cloth filter stage and the inlet just prior to the primary filter stage 25, as will now be described in detail. As seen in both FIGS. 2 and 3, near the inner side of the front wall 88 of the housing 75 of the cloth filter section, and toward the top of the front wall there is an opening designated 89 which communicates with the chamber 90 beneath the cloth filter 80. A conduit 92 is connected to the front wall 88 to route air passing through the opening 89 forwardly and then downwardly into a hollow frame section 93 which is mounted to the main frame 10 above the bins 22, 32 and 69. At the forward end of the hollow tubular frame member 93 there is an opening 94 in the left wall thereof and located just upstream of the inlet filter section 25 and near the bottom of the right side of the inlet plenum 19.

An air balancing plate or valve generally designated 95 is located in the conduit 92. The balancing valve is seen in more detail in FIGS. 4 and 5 as including a valve plate 96 which is sized to completely close off the conduit 92 when the plate 96 is perpendicular to the axis of conduit 92 as shown in dashed line at 96A in FIG. 5. The plate 96 is mounted to a transverse pivot rod 97 located above the horizontal midpoint or center of the plate 96 so that most of the weight of the plate would tend to cause the plate to swing to the closed position 96A. The pivot rod 97 extends through the opposing side walls of the conduit 92 and is conventionally mounted for rotation. An arm or lever 98 is mounted to the pivot rod 97 and located outside the conduit 92. A weight 99 is mounted to the lever arm 98, and the weight 99 may be located at different positions along the lever 98 so as to provide an adjustable closing force. A counterweight 101 is mounted to the upstream side of the plate 96 at a location above the axis of pivot rod 97.

In normal operation, the pressure on the left side of the plate 96 is the same pressure as exists within the chamber 90 below the cloth filter 80 in the cloth filter housing 88. As indicated, that pressure normally is slightly above atmospheric pressure, of the order of 1–2 psi, and it is insufficient to open the plate 96 from the closed position 96A. Should the cloth filter become clogged and the pressure in the housing 90 increase to a predetermined threshold (as determined by the adjustment of the weight 99 on the lever arm 98), the force on the part of the valve plate 96 beneath the pivot rod 97 will overcome the moment created by the weight 99 and cause the plate to rotate counterclockwise as viewed in FIG. 5 to an open position such as that shown at 96B. If the pressure increases even further, the valve plate 96 will open wider to permit more air to flow in the direction of the arrow 102 through the conduit 92 and the hollow frame member 93 to the inlet of the primary or main centrifugal section 25.

Thus, as the pressure within the chamber 90 increases beyond a predetermined limit, the air balancing valve 95 opens permitting air to flow through the feedback conduit 92 and lowering the pressure in the chamber 90.

Because the pressure generated by the pressure unit 72 is substantially constant, this has the effect of maintaining the pressure within the collection bin 69 substantially constant and at the design pressure for effective and efficient operation in separating dust and small particles in the secondary filter stage 65. In other words, the proper operation of the balancing valve 95 in the feedback conduit 92 establishes and maintains the design pressure at the dirty air discharge of the secondary centrifugal filter section 65.

To achieve that proper design pressure it may be necessary to adjust the gate or opening 35 for proper pressure distribution between the main filter stage and the secondary filter stage as established by the main blower 47. Thus, even though the adjustable gate 35 was part of the prior art machine of FIG. 1, it is equally important, if not more important, in the improved combination.

It will be observed that the air passing through the feedback conduit 92 is dirty air, and it is re-introduced to the air cleaning system immediately upstream of the main centrifugal filter stage 25. Therefore, the air passing through the feedback conduit 92 is processed a second time by both the primary and secondary centrifugal filters, and this is considered another advantage of the air balancing valve and feedback conduit in that as the cloth filters begin to clog up, any excess air caused to accumulate in the chamber 90 will create a pressure to open the valve 95 and thereby cause that air to be reprocessed.

The problem and solution may be better understood by way of example. Under normal operating conditions, the pressure in the collection bin 32 will be a nominal −10 psi (i.e., below atmospheric pressure), the pressure in bin 69 is normally in the range of −27 to −32 psi, and the pressure on the pressure side of the cloth filter (i.e., in the chamber 90 of the filter housing 75) will be slightly positive (+1 to +2 psi). If the cloth filter begins to become clogged, the pressure at the pressure surface of the cloth filter may increase to +15 psi. This would result in a decrease in the negative pressure in bin 69 from −30 psi (by way of example) to about −15 psi which is insufficient to operate effectively the discharge passages of the centrifugal filters in the secondary filters stage 65, considering that the pressure in bin 32 will also have decreased.

Thus, by including the balancing valve 95 and setting its operating point at +5 psi, for example, the pressure in bin 69 will stabilize at around −25 psi which is sufficient to operate the secondary filter stage 65 efficiently and effectively.

The adjustable balancing gate 35 is adjusted so that the pressure at the dirty air discharge of the primary centrifugal is approximately equal to or slightly more negative than the pressure at their clean air outlet 27. This has the further effect of slowing the flow of air from bin 32 which permits more of the particles and dust entrained in the dirty air stream from the primary centrifugal filter stage to settle out in bin 32.

Figure 6:
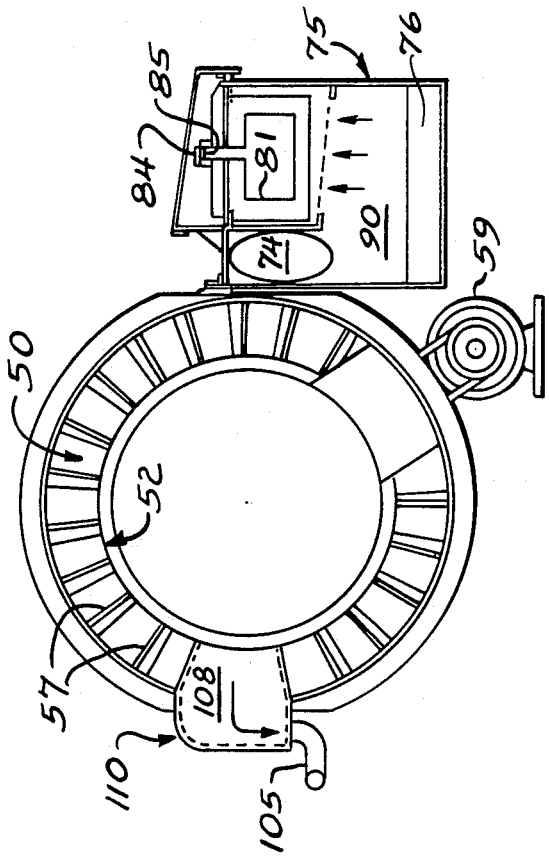
FIG. 6 is a vertical view of the rear of the machine of FIG. 2 with portions of the cloth filter housing in cross section.

Turning now particularly to FIGS. 3 and 6, a device for automatically introducing rock dust (which is intended to mix with fine or particulate coal dust to settle the coal dust from the air and thereby reduce any hazard of explosion) is generally designated 105 in FIG. 3. It includes a hopper 106 for receiving and storing rock dust, which is fed by means of an auger 107 into a conventional mixing chamber. The auger 107 is powered by an hydraulic motor. Two angular sections between vanes 57 are blocked off by a vertical plate 108. Additional metal forming top, bottom and side walls as well as a partial front wall cooperate with the plate 108 and the outer wall 51 of the main blower section to provide an inlet pressure chamber 110. A conduit 111 communicates the outlet of the pressure chamber 110 with the inlet of the mixing chamber to force the rock dust fed into the mixing chamber to mix with air under pressure. The mixture of clean air and rock dust then passes through an exit conduit 112 back through the rear portion of the wall 51 and into the discharge area where the main air discharge stream picks up the aerated rock dust and distributes it downstream of the machine. The purpose of introducing the rock dust is not to reduce any hazard which may exist as a result of coal dust or fine particles in the air exiting form the air cleaning machine. Rather, there is some air which travels toward a mine return which does not get processed by the air cleaning machine, but travels around it. That unprocessed air may have some coal dust in it so the introduction of rock dust by the air cleaning machine also has the effect of settling out coal dust in air which may travel around the air cleaning machine rather than through it for processing.

Having thus disclosed in detail a preferred embodiment of the invention, persons skilled in the art will be able to modify certain of the structure which has been illustrated and to substitute equivalent elements for those disclosed while continuing to practice the principle of the invention; and it is, therefore, intended that all such modifications and substitutions be covered as they are embraced within the spirit and scope of the appended claims.

I claim:

1. In mobile apparatus for processing air in a coal mine or the like to remove dust and respirable components comprising primary filter means receiving incoming air for separating said dust and respirable components from said incoming air into a first dirty air discharge; secondary filter means receiving said first dirty air discharge of said primary filter means for concentrating said dust and respirable components into a second dirty air discharge; cloth filter means for receiving said second dirty air discharge from said secondary filter means for filtering very small and respirable particles therefrom; main blower means for drawing incoming air through said primary and secondary filter means; auxiliary blower means for generating air pressure to draw said second dirty air discharge through said second filter means and for forcing said second dirty air discharge through said cloth filter means under pressure, the improvement comprising: balancing means connecting between the pressure side of said cloth filter means with the inlet of said primary filter means and characterized in that said balancing means opens when pressure on said pressure side of said cloth filter means exceeds a predetermined pressure to permit the operating pressure of said secondary filter means to operate within a design range.

2. The combination of claim 1 wherein said primary filter means comprises a plurality of individual centrifugal filters, each filter having an inlet, a clean air outlet and a dirty air discharge path, the dirty air discharge paths of said first centrifugal filters being routed into a first collection bin; an adjustable gate controlling the flow of air from said first collection bin; and secondary centrifugal filter means receiving the air passing through said adjustable gate and having a clean air discharge and a dirty air discharge; conduit means for routing the clean air discharge of said secondary centrifugal filters to the inlet of said main blower means; a second collection bin receiving the dirty air discharge of said secondary centrifugal filter means, said auxiliary blower means being connected to draw air from said second collection bin and for routing said air into said cloth filter means.

3. The apparatus of claim 1 wherein said cloth filter means comprises a housing having an inlet air manifold; a cloth filter element in said housing, said cloth filter element having a pressure side communicating with the interior of said housing and for at least partially confining the dirty air from said secondary filter means in said housing; said auxiliary blower means charging the interior of said housing to a pressure slightly above atmospheric pressure whereby air within said housing will be forced through said cloth filter element and into the discharge path of said main blower means, said balancing means being connected to said housing of said cloth filter means and being responsive to the pressure in said housing.

4. The apparatus of claim 3 wherein said balancing means comprises conduit means having an inlet communicating with the interior of said housing of said cloth filter means and an outlet communicating with the location immediately upstream of the inlet of said primary filter means, said balancing means further comprising a valve in said conduit means; said valve being normally closed when the pressure in said housing is in a predetermined range and said valve opening to allow air to pass from within said housing to be re-processed by said primary filter means when said balancing valve senses that the pressure within said housing of said cloth filter means is above said range.

5. The apparatus of claim 4 characterized in that said valve includes a plate which continues to open for to permit increased flow from said housing as the pressure in said housing increases above said predetermined range.

6. The apparatus of claim 5 wherein said conduit means of said balancing means includes at least one segment of a hollow longitudinal frame member of said mobile apparatus, said frame member extending from a mid-point of said apparatus forwardly toward an air intake cowling located upstream of said primary filter section.

7. In apparatus for processing air in a coal mine or the like to remove dust and respirable components comprising primary filter means receiving incoming air for separating said dust and respirable components from said incoming air into a first dirty air discharge and for concentrating said dust and respirable components into a dirty air discharge; cloth filter means for receiving said dirty air discharge from said filter means for filtering small respirable particles therefrom and for discharging clean air into the discharge of said main blower means; main blower means for drawing incoming air through said primary filter means; auxiliary blower means for generating air pressure to draw said dirty air discharge through said primary filter means and for forcing said second dirty air discharge through said cloth filter means under positive pressure, the improvement comprising: balancing means connected between the pressure side of said cloth filter means and the inlet of said primary filter means and characterized in that said balancing means is normally closed and opens when pressure on said pressure side of said cloth filter means exceeds a predetermined pressure to permit the operating pressure of said filter means to operate within a design range.

8. The apparatus of claim 7 wherein said cloth filter means comprises a housing having an inlet air manifold; a cloth filter element in said housing, said cloth filter element having a pressure side communicating with the interior of said housing and for at least partially confining the dirty air from said filter means in said housing; said auxiliary blower means charging the interior of said housing to a pressure slightly above atmospheric pressure whereby air within said housing will be forced through said cloth filter element and into the discharge path of said main blower means, said balancing means being connected to said housing of said cloth filter means and being responsive to the pressure in said housing.

9. The apparatus of claim 8 wherein said balancing means comprises conduit means having an inlet communicating with the interior of said housing of said cloth filter means and an outlet communicating with the location immediately upstream of the inlet of said primary filter means, said balancing means further comprising a valve in said conduit means; said valve being normally closed when the pressure in said housing is in a predetermined range and said valve opening to allow air to pass from within said housing to be re-processed by said primary filter means when said balancing valve senses that the pressure within said housing of said cloth filter means is above said range.

10. The apparatus of claim 9 characterized in that said valve includes a plate which continues to open for to permit increased flow from said housing as the pressure in said housing increases above said predetermined range.

11. In apparatus for processing air in a coal mine or the like to remove dust and respirable components comprising filter means receiving incoming air for separating said dust and respirable components from said incoming air into a first dirty air discharge and for concentrating said dust and respirable components into a dirty air discharge; and main blower means for drawing incoming air through said filter means and for discharging clean air from said filter means; the improvement comprising: a housing at a first location in the clean air discharge stream of said blower for collecting clean air under pressure from said discharge stream; and means receiving rock dust and pressurized air from said housing for mixing said pressurized air with said rock dust and for introducing said mixture into said discharge stream at a second location downstream in the direction of air flow from said first location.

* * * * *